April 2, 1968  Q. A. KERNS  3,376,523
TRANSIENT-SUPPRESSING MAGNETIC TRANSMISSION LINE
Filed Dec. 27, 1966  2 Sheets-Sheet 1

INVENTOR.
QUENTIN A. KERNS
BY
Mellin, Moore & Weissenberger
ATTORNEYS

INVENTOR.
QUENTIN A. KERNS

United States Patent Office 3,376,523
Patented Apr. 2, 1968

3,376,523
TRANSIENT-SUPPRESSING MAGNETIC TRANSMISSION LINE
Quentin A. Kerns, Orinda, Calif., assignor to The Regents of The University of California, Berkeley, Calif.
Continuation-in-part of application Ser. No. 366,441, May 11, 1964. This application Dec. 27, 1966, Ser. No. 613,696
5 Claims. (Cl. 333—78)

ABSTRACT OF THE DISCLOSURE

A magnetic transmission line, for example, a power transformer, wherein electrical fields surround the conductors of the line and magnetic fields extend between the conductors, and wherein the line is interrupted by a permeable membrane through which the fields are propagated and wherein low-frequency electric fields are but slightly attenuated in said membrane while high-frequency electric fields are severely attenuated by the skin effect of the membrane so that the membrane will pass low-frequency electromagnetic energy but will filter out high-frequency transients.

Cross-references to related applications

This application is a continuation-in-part of application Ser. No. 366,441, filed May 11, 1964, and now abandoned.

Background of the invention

The purpose of this invention is to provide apparatus for transmission of electromagnetic energy, wherein the transmission of such energy is permitted or enhanced at a desired frequency and wherein the transmission of energy at other frequencies is reduced or eliminated.

As a specific illustration, the present invention has application in a transformer for low-frequency use which does not readily pass frequencies above the low frequency, thus enabling sensitive apparatus connected to the secondary winding to be isolated from higher-frequency "noise" or transients which appear in the circuit connected to the primary winding. Conversely, apparatus connected to the secondary winding which produces many transients can be isolated from the primary winding by means of the invention. A thin conductive membrane of magnetic material separates the primary and secondary windings in the transformer and transects the core therebetween, the membrane being readily penetrated by the electric and magnetic fields at the power line frequency but attenuating high frequencies through skin losses.

Even more particularly, it is an object of the invention to provide a transient-suppressing power transformer. When utilizing sensitive electronic apparatus such as very high-gain amplifiers, it is frequently difficult to suppress extraneous signals which may disrupt or mask desired signals. Ordinary chassis shielding will eliminate noise propagated through the air, but such shielding is ineffective against noise signals entering the circuit through the power supply line. The opposite situation may occur when a particularly "noisy" apparatus, such as a silicon controlled rectifier, must be isolated from the power line to prevent the switching transients in the apparatus from being coupled into the power line.

Summary of the invention

The present invention provides for suppression of high frequencies between the windings of a transformer by introducing skin loss for the higher frequencies while passing a lower frequency, such as a normal power line frequency, with minimal attenuation. The invention functions by introducing high-frequency losses in the transmitted electric and magnetic fields of the transformer. In a preferred form, the transformer utilizes a magnetic circuit comprising two C-shaped cores, one in the primary winding and the other in the secondary winding. The ends of the C cores are spaced apart by a thin membrane made of a magnetic material having moderate electrical resistance. Thus, energy transmitted from the primary core to the secondary core must pass through the membrane. The thickness of the membrane is sufficient to cause considerable attenuation of signals having high frequencies but will cause very little attenuation of the low frequencies. The membrane thus functions as a "window" or filter which passes lower-frequency signals, typically 60 cycles per second, but attenuates higher-frequency signals. There is a small power loss for 60 c.p.s. currents in the order of a few percent, which is generally acceptable where extremely good shielding is to be obtained. For additional shielding, more membranes may be added in a cascade arrangement. The preferred thickness of the membrane may be determined according to the equation:

$$\text{Attenuation} = e^{-\frac{\tau}{\delta}}$$

where $\tau$ is membrane thickness and $\delta$ is skin depth in centimeters. Skin depth is defined as $$\delta = \sqrt{\frac{\rho}{\mu\omega}}$$

where $\mu$ is permeability in henries per centimeter, $\omega = 2\pi$ times frequency, and $\rho$ is resistivity in ohm-centimeter.

Therefore, it is an object of the present invention to provide a new means for suppressing the transference of transient voltages through a magnetic transmission line, such as a power transformer.

It is another object of the present invention to provide a means for isolating sensitive electronic apparatus from transients present in a power line.

It is another object of the present invention to provide a means for isolating a power line from an apparatus which produces many transients.

Other objects and advantages will become apparent in the course of the following detailed description.

Brief description of the drawings

In the drawings forming a part of this application, and in which like parts are designated by like reference numerals throughout the same.

Description of the preferred embodiments

Figure 5:
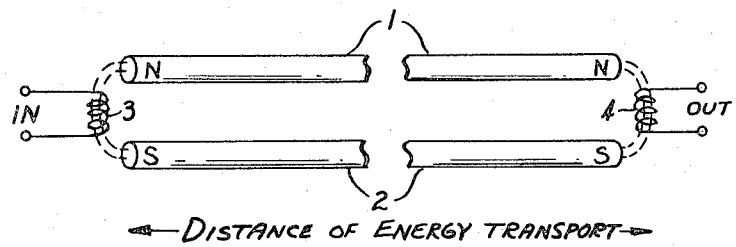
FIG. 5 is a diagram of a magnetic transmission line.
Figure 6:
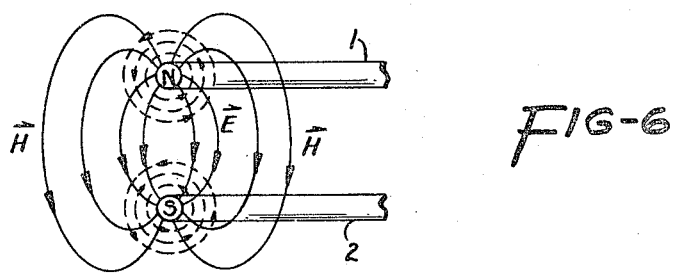
FIG. 6 is a diagram of the magnetic and electrical fields produced when the magnetic transmission line of FIG. 5 is energized.

Referring now to the drawings, and to FIGS. 5 and 6, such drawings illustrate a generalized magnetic transmission line comprising two magnetic conductors 1 and 2, an input coil 3 coupled to one end of the line and an output coil 4 coupled to the other end of the line. If the input coil is energized, magnetic and electrical energy will be transmitted along the transmission line to the output coil, which removes the energy from the line.

FIG. 6 illustrates the energy fields that exist around and between the conductors at an instant in time when conductors 1 and 2 have north and south polarity, respectively. The dotted lines E indicate the electric fields that encircle the conductors, and the solid lines H indicate the magnetic field that extends between the conductors. The electric and magnetic fields are perpendicular to each other. Within the material of the magnetic conductors, there are also perpendicular field lines present. As an approximate description, the magnetic lines are a continuation of the external lines shown and meet at a central point of the magnetic conductors, while the electric lines form a set of concentric circles within the conductors. Since the magnitude (but not the orientation) of these lines depends upon a variety of factors, including the magnitude of the magnetic permeability of the conductors, these internal lines are omitted from the drawings of FIG. 6 for purposes of clarity.

The amplitude of the electric field E depends on a changing magnetic field H, in accordance with Faraday's law, and thus a magnetic transmission line cannot transmit direct current.

In accordance with well-known theory (Poynting's Vector), energy is transmitted along such a system according to the vector equation $\vec{N} = \vec{E} \times \vec{H}$. That is, energy flows along the transmission line, in the form of propagating E and H fields from the input coil or generator to the output coil or load.

The system shown in FIG. 5 is non-discriminatory in frequency in that electromagnetic energy of any frequency introduced at the input end will be transmitted to the output end.

As has been previously mentioned, it is the primary purpose of this invention to provide apparatus wherein low-frequency electromagnetic energy, e.g., at a power-line frequency, may be transmitted from one end of the line to the other with little attenuation and wherein high-frequency transients may be severely attenuated as they travel along such line.

In theory, conventional band-pass filters of choke and filter design could provide satisfactory filtering. However, the physical size of such components that is required at power frequencies makes such an approach impracticable. Further, the filtering or suppression of very high frequencies is questionable unless many cascaded stages of band-pass filtering are employed. At this point, it might be mentioned that in today's technology, transient suppression is desired of frequencies including the entire range of microwaves, millimeter waves and beyond, i.e., of interference pulses having fast or ultrafast rise time, say nanoseconds or picoseconds.

Figure 7:
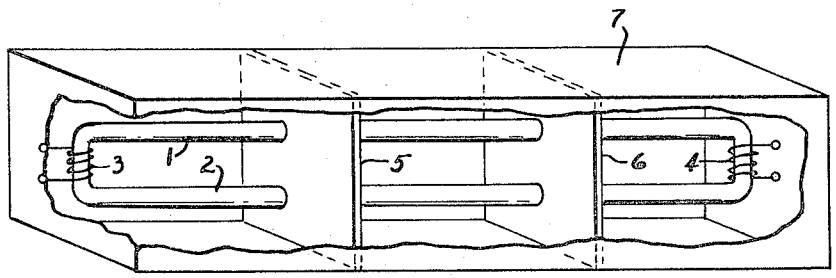
FIG. 7 is a diagram of a magnetic transmission line interrupted by membranes in accordance with the present invention.

In accordance with the present invention, a band-pass filter is not used to impose a restriction on the frequency band which is transmitted or rejected. Instead, a wall, or membrane, 5, FIG. 7, is interposed across the transmission line. The magnetic conductors do not extend through this wall, but stop at one side thereof and start again on the other side. Thus, energy to be transmitted from one end of the transmission line must be propagated through the bulk material of the wall, and not through openings in the wall.

The wall or membrane 5 is sufficiently thick so that it will allow low-frequency energy to be propagated therethrough with little attenuation. However, the skin effect of the wall causes severe attenuation of higher frequencies and thus attenuates the higher frequencies of the transients on the input side of the transmission line and prevents such frequencies from being transmitted to the output of the line. As an example, $$\text{attenuation} = e^{-\frac{\tau}{\delta}} = e^{-\frac{\tau}{\sqrt{\frac{\rho}{\mu\omega}}}}$$

As $\omega$ (radian frequency) becomes very large, the attenuation at that frequency becomes very large. For example, the effectiveness of the attenuation of the wall for an iron plate .010 inch thick at 1000 megacycles per second is more than $10^{200}$.

Attenuation can be increased by cascading the walls, as indicated at 5 and 6, along the length of the transmission line.

Attenuation can also be increased by providing walls which comprise a number of laminated plates, the interfaces of which are electrically insulated from each other.

Thus far, the description of FIG. 7 has been with reference only to the shielding provided by the wall 5 interrupting the transmission line to isolate the output end of the line from spurious signals introduced at the input end of the line. If in addition it is desired to shield the output end of the line from energy that is generated elsewhere and radiated to the line, then the entire output end of the line should be enclosed by a shield 7 which is attached to the walls or membranes 5 and 6. Thus, the entire output end of the line would be enclosed by a shield of which the walls 5 and 6 form a part thereof. Only the walls 5 and 6, where the selected energy is to be beamed through, need have suitable frequency-sensitive properties. The remainder of the shield can be less specialized, since its function is to be a barrier to all energy, whether in the desired range or not.

The principles of the invention thus described are utilized in the forms of the invention illustrated in detail in FIGS. 1-4.

Figure 1:
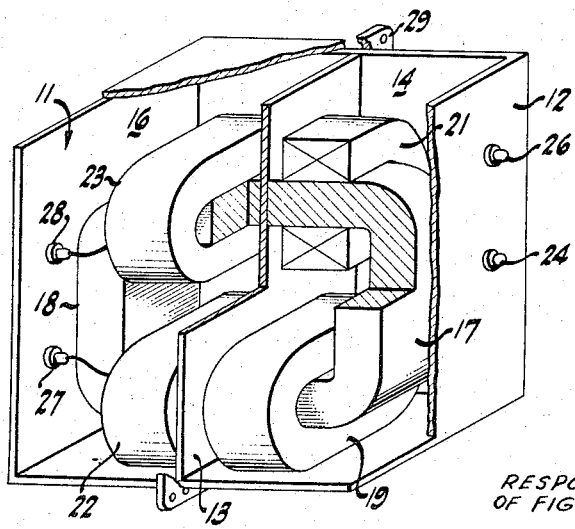
FIG. 1 is a broken-out perspective view of the power transformer.

FIG. 1 shows a transformer 11 having a rectangular steel casing 12. A thin planar membrane 13 made of a magnetic, electrically conductive steel such as Hypersil or of M5 or M6 oriented grain steel is secured across the center of the housing 12 and divides such housing into two chambers 14 and 16. Two identical C-shaped cores 17 and 18 are disposed in chambers 14 and 16 respectively. The cores 17 and 18 have a rectangular cross section and are comprised of many thin laminations of iron stacked together, the so-called tape-wound core. The ends of both of the cores 17 and 18 are disposed in contact with the membrane 13 at corresponding areas on the opposite sides thereof so that there is minimal spacing between the ends of the cores, thus providing a complete magnetic circuit. As will be noted, the two cores 17 and 18 form a magnetic transmission line.

A pair of primary coils 19 and 21 are wound around the two legs of primary core 17, while a pair of secondary coils 22 and 23 are wound around secondary core 18. Primary terminals 24 and 26 are insulatingly mounted in the housing 12 to connect a power line to the primary coils 19 and 21. Similarly, secondary terminals 27 and 28 are mounted on the opposite side of the housing 12 to provide for an external connection to the secondary coils 22 and 23. A mounting flange 29, provided around the casing 12 parallel to the membrane 13 but not necessarily in the same plane, facilitates securing the transformer in the wall of a shielded enclosure so that an electrically tight seal can be made.

Only the salient aspects of the transformer 11 have been described, conventional support members and potting material being omitted to better show the construction of the invention.

Considering now the operation of the invention as used in a power supply, an A.C. voltage, typically alternating at 60 cycles per second, is applied to the primary input terminals 24 and 26. Present in the A.C. voltage are high-frequency transients or similar signals. The 60-cycle-per-second portion of the primary voltage passes through the primary coils 19 and 21 and creates a magnetic field through the core while an electric field is created at right angles to the magnetic field, i.e., encircling the legs of the C core 17. An electric field which varies at a low frequency, such as the power frequency, can readily penetrate the membrane 13 and induce a voltage in the secondary windings 22 and 23. However, electric fields varying at a higher frequency are severely attenuated by the skin loss in the membrane 13, so that minimal high-frequency potentials are induced in the secondary windings 22 and 23.

The membrane 13 is made from some material having a high permeability so that the low-frequency magnetic field is readily transferred from the primary to the secondary side of the transformer 11. Thus the low-frequency magnetic field is not appreciably affected by the membrane. However, the conductivity of the membrane 13 is high and the high-frequency electric field is affected appreciably. Both an electric and a varying magnetic field are required to induce a potential in the secondary windings, and in this invention both the magnetic field and the electric field associated with high frequencies are eliminated.

Figure 2:
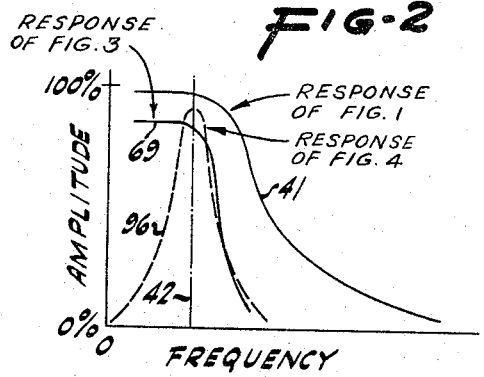
FIG. 2 is a graph indicating the variation of signal amplitude with frequency for various embodiments of the transformer.

By reference to FIG. 2, a typical response curve of potentials induced into the secondary windings 22 and 23 may be seen as a function of frequency. Frequency is shown along the abscissa and amplitude along the ordinate. The response curve 41 indicates a high amplitude response at low frequencies, which rapidly decreases at higher frequencies. The power-line frequency lies at a point 42 on the abscissa under the highest portion of the curve 41.

Figure 3:
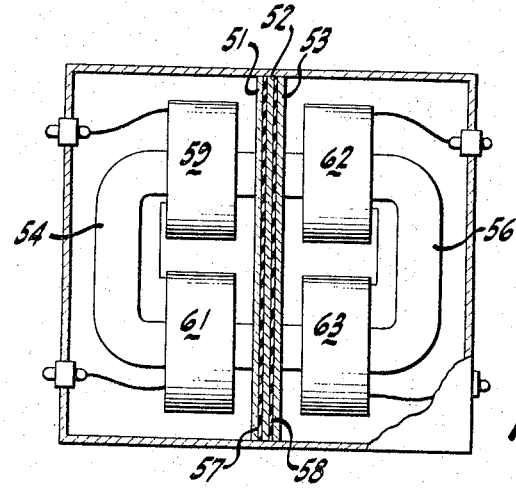
FIG. 3 is a section view of a second embodiment of the transformer.

If additional attenuation of high-frequency signals is necessary, a laminated membrane can be used as shown in FIG. 3, which shows, in cross section, a transformer of the same general class as shown in FIG. 1. In the transformer of FIG. 3, however, the membrane is comprised of three laminated membrane elements 51, 52 and 53, inserted between the ends of two C cores 54 and 56. It is necessary that a thin layer of insulation separate the interfaces of the membrane elements 51, 52 and 53, preferably such insulative layers 57 and 58 being formed by an oxide coating on the membrane elements. With the structure of FIG. 3, the attenuation between the primary windings 59 and 61 to the secondary windings 62 and 63 is approximately the cube of that of the structure of FIG. 1, as indicated by response curve 69 in FIG. 2. While the losses at the power-line frequency are also increased somewhat, such loss is generally acceptable if extremely good filtering is obtained.

Figure 4:
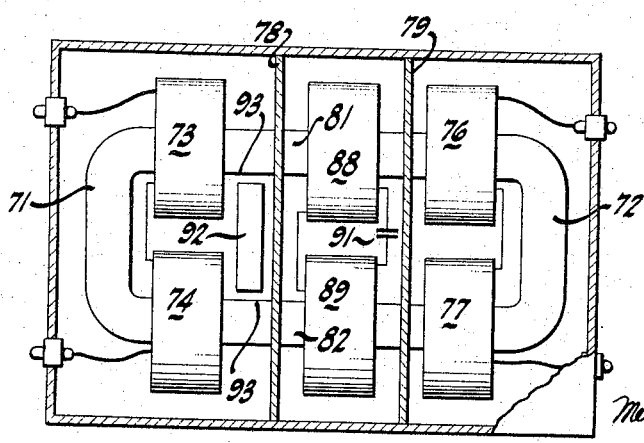
FIG. 4 is a section view of a third embodiment of the transformer.

Referring now to FIG. 4, there is shown another embodiment of the invention in which the filtering effect of the membranes is combined with a resonant circuit tuned to the power-line frequency to provide greater attenuation of extraneous signals having frequencies both above and below the power line frequency. A primary and secondary C core 71 and 72 are provided as in the devices of FIGS. 1 and 3. Primary coils 73 and 74 and secondary coils 76 and 77 are disposed over the legs of the C core 71 and 72 as previously described. The ends of the C cores 71 and 72 are placed in contact with a pair of spaced-apart membranes 78 and 79. Two cores 81 and 82, each short, straight core sections having the same cross section and made from the same material as the C cores, are aligned with the legs of the C cores 71, 72 between the membranes 78 and 79. A pair of resonant coils 88 and 89 are disposed around the I cores 81 and 82 and are connected together in series with a capacitor 91, the components forming a resonant circuit at the power-line frequency. A magnetic shunt 92, a long I-shaped core member, is disposed between the two legs of the primary C core 71 and is spaced therefrom by short air gaps 93. The shunt 92 provides voltage regulation and functions conventionally. Many embodiments of the transient suppressing transformer include the voltage-regulating shunt, although there is no interdependence between the two functions.

In operation, the membranes 78 and 79 function in exactly the same way as described with reference to FIGS. 1 and 3. The advantage of the transformer shown in FIG. 4 is that discrimination is obtained against frequencies nearer the power line frequency—that is, sharper cut-off is obtained than with the previously described transformers. The resonant circuit functions to attenuate frequencies which are not at the power line frequency or harmonics of the power line frequency, while the membranes 78 and 79 attenuate the harmonics of the power line frequency, providing a narrow response curve as indicated by dashed line 96 in the graph of FIG. 2. The transformer of FIG. 4 is preferred when frequencies very near the power line frequencies must be eliminated.

In environments where substantially high frequencies of interference are encountered it is necessary that the casing and membrane, forming the shield for the coil of the transformer to be shielded, be completely free of holes. Otherwise, at elevated interference frequencies in the centimeter, millimeter or beyond wave lengths, any holes would allow undesired transmission of interference energy by the various well-known waveguide modes of propagation. However, the transformers as shown in the drawings have no holes in the membrane and no waveguide propagation is possible therethrough. There is left only propagation through the membrane material itself, with the consequent advantage that the attenuation of interference is a continuously increasing function of frequency.

Although the membranes illustrated in the drawings are shown as flat in form, they may be curved or made in other shapes as desired, as long as they form a continuous surface which can be connected to other surfaces to form an enclosing structure for the region to be shielded.

Transformers of the character described are particularly useful in electronics instrumentation operating at transistor-to-tunnel diode voltage levels which must be shielded from outside electrical noise, for example in preamplifiers, sensitive communication and telemetry equipment, low-level pulse discriminators, counting and scaling devices, and fast computer logic.

Another class of use of the present invention arises where power has to be supplied to a device which could radiate objectionable noise energy if it were not thoroughly shielded, as for example, filament and power transformers for large thyratrons or radio frequency transmitters, dielectric welders, diathermy apparatus, high power radar modulators, pulsed laser power supplies, Kerr-cell and Pockels-effect modulators, or radio frequency systems for particle accelerators.

Figure 8:
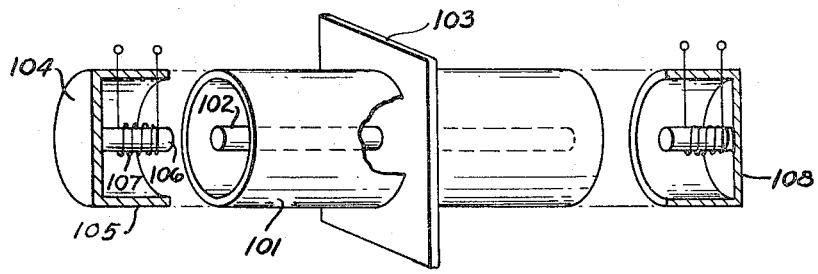
FIG. 8 is a perspective view, partially exploded and partly in section, of another embodiment of the invention.

A still further embodiment of the invention is shown in FIG. 8, wherein a concentrically arranged magnetic transmission line is illustrated. In this embodiment an outer magnetic conductor 101 surrounds an inner magnetic conductor 102, the conductors being interrupted by a membrane 103 of a type as previously described. An input device 104 having an outer shell 105, a central core 106 and an input coil 107 surrounding the core is utilized to energize the transmission line. A similar output device 108 removes the transmitted energy from the line.

In this case, the magnetic field H extends radially between the inner and outer conductors, in a direction depending upon the instantaneous polarity of the system, and the electric field E extends circumferentially around the inner conductor, filling the annular space between the conductors.

The operation of this embodiment is the same as before in that the transmitted energy must be propagated through the wall. The low-frequency electric field is but slightly attenuated, whereas high-frequency electric fields are severely attenuated.

Other configurations of magnetic transmission lines may be used in conjunction with the interrupting membrane described herein, to achieve selective-frequency transmission of electromagnetic energy.

It is to be realized that the various forms of the invention herein shown and described are to be taken as preferred embodiments of the same, and that various changes may be made in the shape, size or arrangement of elements without departing from the spirit of the invention or the scope of the attached claims.

For example, although a permeable, metallic membrane is shown, it would be possible to use a permeable semiconductive membrane, or a membrane having certain exceptional dielectric properties in combination with its values of $\mu$ and $\rho$.

Having thus described by invention, I claim:

1. A transformer for use at a desired low frequency comprising:
   (a) first and second opposed C-shaped core parts each having two ends;
   (b) a third core part having ends aligned with and spaced slightly from one end each of said first and second core parts;
   (c) a fourth core part having ends aligned with and spaced slightly from the other end each of said first and second core parts;
   (d) first, second, third and fourth coils wound one each on said first, second, third and fourth core parts respectively, said third and fourth coils having one end of each connected together;
   (e) a capacitor connecting the other ends of said third and fourth coils, said third and fourth coils and said capacitor being resonant at said desired low frequency;
   (f) a first continuous electrically conductive shield completely enclosing said first core part and first coil, said shield including a first thin, highly permeable, electrically conductive membrane disposed between said first core part and said third and fourth core parts and extending between the aligned ends of said first core part and said third and fourth core parts;
   (g) a second continuous electrically conductive shield completely enclosing said third and fourth core parts and said third and fourth coils and said capacitor, said second shield including said first membrane and a second thin, highly permeable, electrically conductive membrane disposed between said second core part and said third and fourth core parts and extending between the aligned ends of said second core part and said third and fourth core parts;
   (h) said membranes each having a thickness providing minimal skin loss at said desired low frequency while having an appreciably greater skin loss at higher frequencies.

2. A transformer for use at a desired low frequency comprising:
   (a) first and second opposed C-shaped core parts each having two ends;
   (b) a third core part having ends aligned with and spaced slightly from one end each of said first and second core parts;
   (c) a fourth core part having ends aligned with and spaced slightly from the other end each of said first and second core parts;
   (d) first, second, third and fourth coils wound one each on said first, second, third and fourth core parts respectively, said third and fourth coils having one end of each connected together;
   (e) a capacitor connecting the other ends of said third and fourth coils, said third and fourth coils and said capacitor being resonant at said desired low frequency;
   (f) a first thin, highly permeable, electrically conductive membrane disposed between said first core part and said third and fourth core parts and extending between the aligned ends of said first core part and said third and fourth core parts;
   (g) a second thin, highly permeable, electrically conductive membrane disposed between said second core part and said third and fourth core parts and extending between the aligned ends of said second core part and said third and fourth core parts;
   (h) said membranes having a thickness providing minimal skin loss at said desired low frequency while having an appreciably greater skin loss at higher frequencies.

3. Apparatus for transmitting energy at a first frequency for suppressing transmission of energy at a second and higher frequency, comprising:
   (a) a magnetic transmission line having first and second conductors;
   (b) a thin, highly permeable membrane completely interrupting and extending between said conductors, said membrane comprising a plurality of laminated elements having their interfaces electrically insulated from each other and each laminated element having a thickness providing minimal skin loss at said first frequency while having an appreciably greater skin loss at said second frequency;
   (c) means for generating a varying magnetic field at one end of said line;
   (d) means for removing magnetic energy from the other end of said line.

4. Apparatus for transmitting energy at a first frequency and for suppressing transmission of energy at a second and higher frequency, comprising:
   (a) a magnetic transmission line having first and second conductors;
   (b) a first thin, highly permeable membrane completely interrupting and extending between said conductors, said membrane having a thickness providing minimal skin loss at said first frequency while having an appreciably greater skin loss at said second frequency;
   (c) a second thin, highly permeable membrane completely interrupting and extending between said conductors in said transmission line spaced from said first membrane, said second membrane having a thickness providing minimal skin loss at said first frequency while having an appreciably greater skin loss at said second frequency;
   (d) means for generating a varying magnetic field at one end of said line;
   (e) means for removing magnetic energy from the other end of said line.

5. A transformer for use at a desired low frequency comprising:
   (a) a primary core having ends;
   (b) a secondary core having ends aligned with and slightly separated from said primary core ends;
   (c) a primary coil wound on said primary core;
   (d) a secondary coil wound on said secondary core;

(e) a thin, highly permeable membrane disposed between said primary and secondary core ends, said membrane completely separating and extending between said core ends, said membrane comprising a plurality of laminated elements having their interfaces electrically insulated from each other, each laminated element having a thickness providing minimal skin loss at said desired low frequency while having an appreciably greater skin loss at higher frequencies.

References Cited

UNITED STATES PATENTS

| | | | |
|---|---|---|---|
| 2,114,189 | 4/1938 | Kronmiller | 336—84 |
| 2,388,848 | 11/1945 | Howe | 336—84 |
| 2,799,834 | 7/1957 | Kirkland | 336—84 X |
| 3,227,973 | 1/1966 | Gray | 333—78 |

ELI LIEBERMAN, *Primary Examiner.*

HERMAN K. SAALBACH, *Examiner.*

P. L. GENSLER, *Assistant Examiner.*